United States Patent Office 2,950,201
Patented Aug. 23, 1960

2,950,201

METHOD OF PRESERVING ROYAL JELLY

Marino Golinelli, Via Petrarcap 11, Bologna, Italy

No Drawing. Filed Mar. 2, 1959, Ser. No. 796,253

Claims priority, application Italy Oct. 28, 1955

3 Claims. (Cl. 99—150)

The present invention relates to a method of and the means for conserving royal jelly indefinitely.

This is a continuation-in-part of the co-pending application Serial No. 615,016, filed October 10, 1956, now abandoned.

It is known that royal jelly has generally the drawback of being preserved for a short time due to the biological activity of its components.

It is one object of the present invention to provide a method of and means for conserving royal jelly indefinitely and for insuring the preservation of the biological and dietic activities of the royal jelly.

The method according to the present invention comprises substantially the steps of micro-suspension of the royal jelly, stabilization of the proteins, infiltration and lyophilization.

The first-mentioned step consists of micro-suspension of the royal jelly as soon as it is taken off the bee-hive in distilled water in proper proportion, namely about 100 grs. of jelly in 2000 mlls. of water, buffering with a mixture of citric acid, sodium citrate and a mixture of Sorensen and Clark, and having a pH of about 5.7 to 5.9. This operation must be performed in the presence of an inert gas and without light.

Thereafter the stabilization of the proteins is provided by about 2 grs. of lactalbumin and about 1 gr. of gliadin. These weights are used for approximately 100 grs. of unmelted royal jelly. By means of the use of the above-mentioned colloids, the denaturization of proteinic component of the royal jelly during the present process is prevented.

The product obtained is opalescent and is subjected to infiltration by means of continuous centrifugation at low rates. The necessary centrifugal force is 1000 g.

Then follows the phase of lyophilization. The filtered product is filled in large bottles of dark glass and is slowly congealed at —10° C., in lyo-state with cooled plates. Then by subjecting the product to a vacuum lower than 50 micron Hg., it becomes evaporated. During this operation it appears indispensable to maintain the temperature between —10° C. and —5° C.

Thereafter the temperature is raised to +20° C. for at least five hours, and the product is maintained under a vacuum less than 5 micron Hg., in order to arrive at a residual humidity of no more than 0.1%.

The bottles contain during filling a dry inert gas and are then hermetically sealed.

While I have disclosed one embodiment of the present invenion, it is to be understood that this embodiment is given by example only and not in a limiting sense, the scope of the present invention being determined by the objects and the claims.

I claim:

1. A method of preserving of royal jelly comprising the steps of subjecting said jelly to a micro-suspension in distilled water, and buffering the resulting product with a mixture of citric acid, sodium citrate and a mixture of Sorensen and Clark, and having a pH of about 5.7 to 5.9, adding of lactalbumin and gliadin to said suspension to stabilize the proteins in order to prevent the denaturization of the proteinic component, said suspension being subjected to continuous centrifugation at a centrifugal force of 1000 g. in order to filter said suspension, said product being subjected to slow congealing at a temperature of —10° C. and subjecting said congealed product to evaporation under a vacuum less than about 50 micron Hg.

2. The method, as set forth in claim 1, wherein said steps are performed in the presence of an inert gas and without light.

3. The method, as set forth in claim 1, which includes the step of raising the temperature of said evaporated product to a temperature of about —20° C. for at least about five hours at a vacuum less than 5 micron Hg.

References Cited in the file of this patent

"The Miracle of Royal Jelly," by Raymon Dubois, 1955, Waldon Press, p. 94.